O. ABEREGG.
TIME RECORDING MECHANISM.
APPLICATION FILED NOV. 4, 1915.
1,234,708.
Patented July 31, 1917.
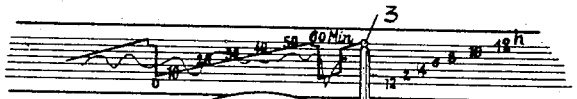
Fig. 1.
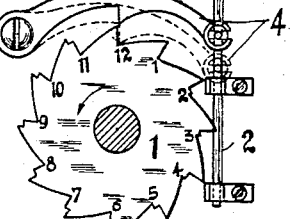
Fig. 2.
Fig. 3.
Fig. 4.
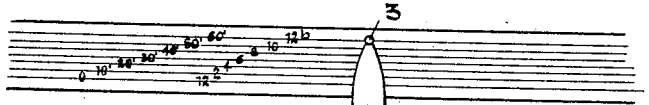
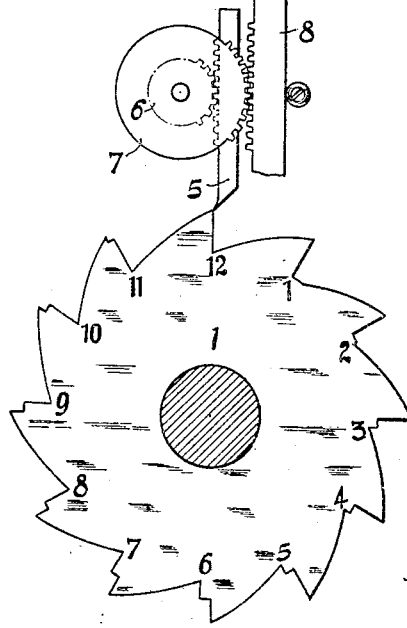
Inventor:
Otto Aberegg

UNITED STATES PATENT OFFICE.

OTTO ABEREGG, OF BERNE, SWITZERLAND, ASSIGNOR TO HASLER A. G. VORMALS TELEGRAPHEN-WERKSTAETTE VON G. HASLER, OF BERNE, SWITZERLAND, A CORPORATION OF SWITZERLAND.

TIME-RECORDING MECHANISM.

1,234,708.      Specification of Letters Patent.      Patented July 31, 1917.

Application filed November 4, 1915. Serial No. 59,583.

*To all whom it may concern:*

Be it known that I, OTTO ABEREGG, a citizen of the Swiss Confederation, and residing at Berne, Switzerland, have invented certain new and useful Improvements in Time-Recording Mechanism, of which the following is a specification.

This invention relates to mechanism for recording the time of day on strips of paper used in tachometers for recording speed of travel.

Known systems of marking the time of day on the charts of recording tachometers can be divided into two classes.

The more usual form is that in which the time is printed beforehand on the charts, such a chart being mounted corresponding to the time of day and driven by a clock. This system has the advantage of there being no actual recording of time, but it has the great disadvantage of continuous consumption of paper not only when traveling, but also during every stop. In addition the driver may readily set the chart incorrectly, in which case the actual time as indicated by the clock comprised in the apparatus, will not agree with the time printed on the chart. The value of such a time record is very small.

The second principal class is much more correct, in which the time of day is recorded on the chart by means of a recording device by the clock itself. This mode of recording the time has the following advantages:

Firstly the time is recorded at right angles to the movement of the chart. It is consequently not necessary for the chart to be unwound proportionally to the time, as when the chart is printed in advance. The great advantage is obtained that the chart can be fed proportionally to the length of the path traveled, whereby better speed diagrams are obtained and it is possible to find on the diagram single points of the road traveled by means of a foot rule or the like. Secondly, during stops the time is continuously recorded while the chart is stationary, *i. e.* without waste of paper. Thirdly, a new roll of paper can be inserted without any regard to the time of day. Fourthly, the paper is always fully utilized.

On the other hand, the sole disadvantage of this mode of recording the time is that the breadth of the chart is generally very small, so that it is difficult to record exactly short and long stops by means of only one recording device. If it is wished to have the short stops recorded exactly to the minute the recording style or pen must move rapidly, *i. e.* move across the breadth of the diagram at disposal in a relatively short time. As the chart does not move forward during the stop the defect is met with that long stops cannot be read, because the style or pen continues to move up and down at the same place on the same vertical line. If the time were recorded by using two devices, one of which moves rapidly and indicates the stops to the minute, while the other moves slowly and indicates the hours of long stops, the disadvantage of this method of recording the time could be obviated.

A primary object of this invention is to obviate the above mentioned defect when using one single time recording device, *i. e.* one single recording style or pen.

To this end the invention consists in the construction, arrangement and combination of parts described hereinafter and pointed out in the claims.

One illustrated embodiment of the invention and a modification thereof are diagrammatically represented by way of example in the accompanying drawing, wherein:—

Figure 1 is an elevation showing one form of device according to the invention,

Figs. 2 and 3 show diagrams made on charts by means of the device, and

Fig. 4 is an elevation of a modified device.

According to Fig. 1 the wheel or disk 1, which is rotated once in 12 hours by a clock, has 12 teeth which lift the rod 2 of the recording style or pen 3 by means of the lever 4. The shape of the teeth is such that the recording pen is lifted exactly proportionally to the time. By means of a suitable ratio of transmission the maximum lift imparted to the rod 2 by the teeth can be brought into agreement with the space on the chart available for the time diagram. Fig. 1 shows the moment at 12 o'clock immediately before the rod 2 falls down to the base of the next tooth. After 60 minutes have expired, i. e. at 1 o'clock, the rod 2 will fall from the point of this tooth to the bottom of the next. This time, however, it does not fall the same distance, but only $\frac{11}{12}$ thereof. In spite of the wheel 1 rotating, the rod 2 remains for 5 minutes at the same elevation and begins to rise after the fifth minute. At 2 o'clock the rod 2 will fall only $\frac{10}{12}$ of the total height of the tooth, will remain 5 minutes at this elevation, will fall another $\frac{1}{12}$ of the same height after the fifth minute and will then rise uniformly again. At 3 o'clock the rod 2 falls only $\frac{2}{12}$, at 6 o'clock only $\frac{5}{12}$, at 9 o'clock only $\frac{3}{12}$, at 11 o'clock only $\frac{1}{12}$ of the height of the teeth and falls to $\frac{11}{12}$ of the height only after 5 minutes.

Corresponding to the fall of the recording pen interrupted at various elevations depending on the time of day one obtains on the chart not only the moment when each hour expires, but also an indication of the hour that expires. Figs. 2 and 3 are portions of charts on which time diagrams have been recorded.

Each chart comprises 7 lines which are equidistant one from another. During exactly 60 minutes the pen moves at a uniform speed across the recording area located between the two outermost lines of the chart. Consquently the space between two adjacent lines may be designated a 10 minute zone.

The same printed lines also serve for reading the hours. As mentioned above, the recording rod falls unimpededly at 12 o'clock to the base of the teeth, and the pen marks on the chart a vertical line down to the lowest printed line. At 1 o'clock the rod falls only $\frac{11}{12}$ of the width of the diagram. The pen then remains for 5 minutes at an elevation $\frac{1}{12}$ of the width of the diagram above the bottom line. When the vehicle travels the paper moves uniformly and at right-angles to direction of motion of the pen 3. The time 1 o'clock is thus designated by the horizontal line $\frac{1}{12}$ above the base line, 2 o'clock by the line $\frac{2}{12}$ above the base line coinciding with the first printed line above the base line, 4 o'clock by the line $\frac{4}{12}$ above base line coinciding with the third printed line, and so on.

While the vehicle is stationary the paper feed is stopped, but the recording of the time continues at right-angles to the chart. The level of the lower end of the vertical line recorded during the stop indicates the time when the vehicle stopped; the length of vertical line indicates the exact duration of the stop. An example is illustrated in Fig. 3. In this diagram the first stop is shown from 10.30 to 10.40 and the vertical line indicates that the stop lasted 10 minutes, for, as stated above, the interval or space between two adjacent lines represents 10 minutes.

The 2nd stop was from 11.10 to 11.55=45 min. stop.

The 3rd stop was from 12.40 to 1.25=45 min. stop.

The 4th stop was from 2.40 to 9.25=6 hr. 45 min. stop.

The 5th stop was from 2.40 to 9.25=6 hr. 45 min.+12. or 24 hours stop. At the last stop the vertical line is drawn down to the base line which proves that the pen fell at least once to this line which can occur only once in 12 hours.

As the hours are recorded only when the paper moves, i. e. while the vehicle is traveling, the hour can always be read from the last hour recorded. When a stop lasts for several hours its duration can be determined from the last and the next hour recorded. This will be understood from the 4th stop in Fig. 3.

Fig. 4 shows a modified form of the device in which the teeth of the hour wheel 1 actuate a vertical toothed rack 5, whose motion is transmitted by means of the gear wheels 6 and 7 to the vertical rack 8 which carries the recording style or pen 3 at its upper end.

Instead of the toothed rod 8 carrying the pen 3 being actuated indirectly by the toothed disk 1 it may be actuated directly, but the former arrangement has the advantage of greater accuracy and convenience in recording and reading because the records are enlarged. Also, if preferred, the recording rod may be moved downward by a spring, for example, instead of solely under the action of gravity.

The hour wheel may have 24 instead of 12 teeth, the same being analogously provided with steps. Such an hour wheel will enable both the hours of the day and night to be recorded.

I claim:

1. In time recording mechanism, the combination with a chart adapted to be fed longitudinally, of a recording member arranged in operative relation to and movable at right-angles to the direction of motion of the chart, and a clock-driven member provided with teeth and a movable intermediate member adapted to be moved by said clock-driven member to impart to the recording member movements which vary in magnitude corresponding to the hours to be recorded, for the purpose specified.

2. In time recording mechanism, the combination with a chart adapted to be fed longitudinally, of a rod movable at right-angles to the direction of motion of the chart, a recording member carried by the rod in operative relation to the chart, and a clock-driven member having teeth adapted to drive the rod, the teeth being of various shapes corresponding to the hours to be recorded, for the purpose specified.

3. In time recording mechanism, the combination with a chart adapted to be fed horizontally, of a rod movable vertically a recording member carried by the rod in operative relation to the chart, and a clock-driven disk having teeth adapted to uniformly lift the rod and to allow the same to fall at the hours, the height of the tooth corresponding to the last hour being a maximum, the height of the tooth corresponding to the first hour being a fraction thereof, each of the remaining teeth being stepped and of a height equal to that of the tooth corresponding to the first hour.

4. In time recording mechanism, the combination with a chart adapted to be fed horizontally, of a rod movable vertically, a recording member carried by the rod in operative relation to the chart, and a clock-driven disk having teeth each adapted to lift the rod at a uniform speed and to allow the same to fall at an hour, the height of the hour corresponding to the last hour being a maximum, the height of the tooth corresponding to the first hour being a fraction thereof proportional to the number of teeth, each of the remaining teeth being stepped and of a height equal to that of the tooth corresponding to the first hour, the height of the step of each tooth being proportional to the corresponding hour to be recorded thereby.

5. In time recording mechanism, the combination with a chart adapted to be fed horizontally, of a rod movable vertically, a recording pen carried by the rod in operative relation to the chart, a clock-driven disk having a number of teeth corresponding to the number of hours to be recorded, and gearing operatively connected with the rod and adapted to be lifted uniformly by each tooth and suddenly released thereby, the teeth being adapted to impart to the gearing, rod and pen movements which vary in magnitude corresponding to the hours to be recorded.

In testimony whereof I affix my signature.

OTTO ABEREGG.

Copies of this patent may be obtained for five cents each, by addressing the "Commissioner of Patents, Washington, D. C."